United States Patent
Ishii et al.

(10) Patent No.: US 6,698,939 B2
(45) Date of Patent: Mar. 2, 2004

(54) METHOD FOR PROCESSING AN INSERT PIPE FOR USE IN INJECTION MOLDING

(75) Inventors: Kiyoshi Ishii, Isikawa (JP); Akira Kato, Tokyo (JP)

(73) Assignees: Mold Research Institute Co., Ltd., Tokyo (JP); Kabushiki Kaisha Act One, Tokyo (JP)

( * ) Notice: Subject to any disclaimer, the term of this patent is extended or adjusted under 35 U.S.C. 154(b) by 0 days.

(21) Appl. No.: 10/302,231

(22) Filed: Nov. 22, 2002

(65) Prior Publication Data

US 2003/0152318 A1 Aug. 14, 2003

Related U.S. Application Data

(62) Division of application No. 09/529,944, filed on Apr. 20, 2000, now Pat. No. 6,511,232.

(30) Foreign Application Priority Data

Sep. 10, 1998 (JP) ............................................. 10-256504
Jul. 23, 1999 (JP) .................................. PCT/JP99/03960

(51) Int. Cl.⁷ ................................................. G02B 6/36
(52) U.S. Cl. .............................. 385/78; 385/60; 385/66; 264/156; 72/333; 72/370.27
(58) Field of Search ................................. 264/219, 273, 264/156, 274; 425/303; 428/34.1, 132; 72/333, 370.27, 324, 325; 385/60, 78

(56) References Cited

U.S. PATENT DOCUMENTS 3,281,513 A * 10/1966 Stripp ........................ 264/156
5,172,920 A * 12/1992 Schlenk ....................... 277/654
5,672,405 A *  9/1997 Plank ......................... 425/127

FOREIGN PATENT DOCUMENTS

JP    2000-111758   *  4/2000
JP    2001-096570   * 10/2001
WO   WO 98/25713    *  6/1998

* cited by examiner

*Primary Examiner*—John Juba
*Assistant Examiner*—Leo Boutsikaris
(74) *Attorney, Agent, or Firm*—Marshall & Melhorn, LLC

(57) ABSTRACT

A number of holes (3) are formed in the outer circumferential wall (2) of a tubular metallic pipe (1) at regulator intervals in both circumferential and axial directions. Each of the holes (3) consists of a polygonal opening (4) and raised pieces (5) formed by bending the material from the peripheral edge surrounding the opening (3). This pipe may be used as an insert pipe in injection molding an article such as a lead screw, an optical fiber ferrule or the like. The raised pieces reinforce the part of the pipe surrounding each hole, and enhances the bonding between the molding material and insert pipe.

8 Claims, 4 Drawing Sheets

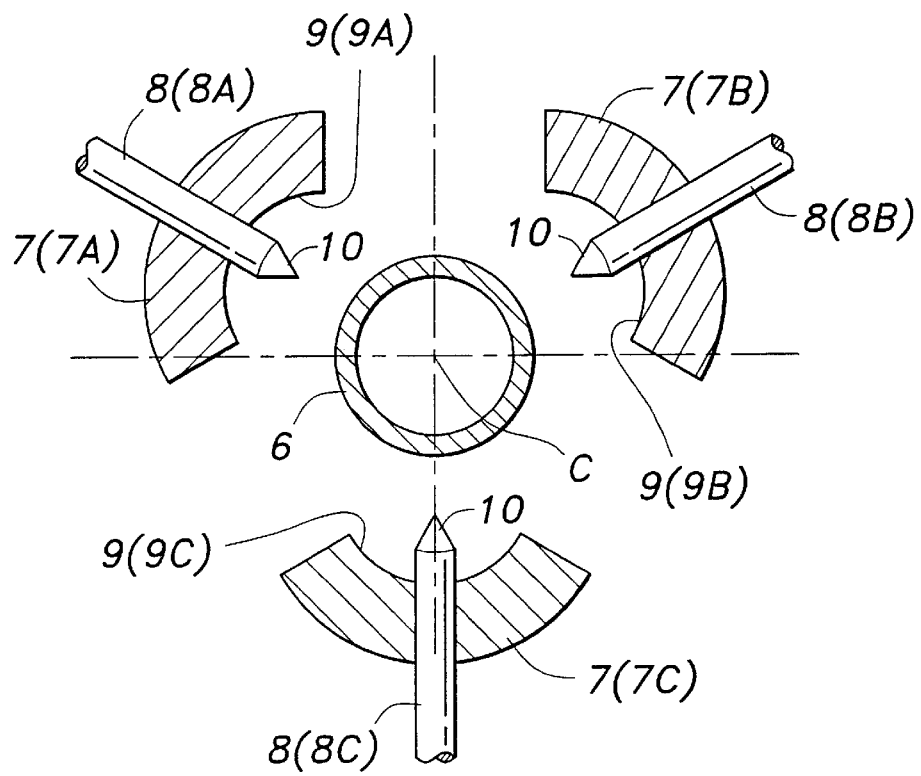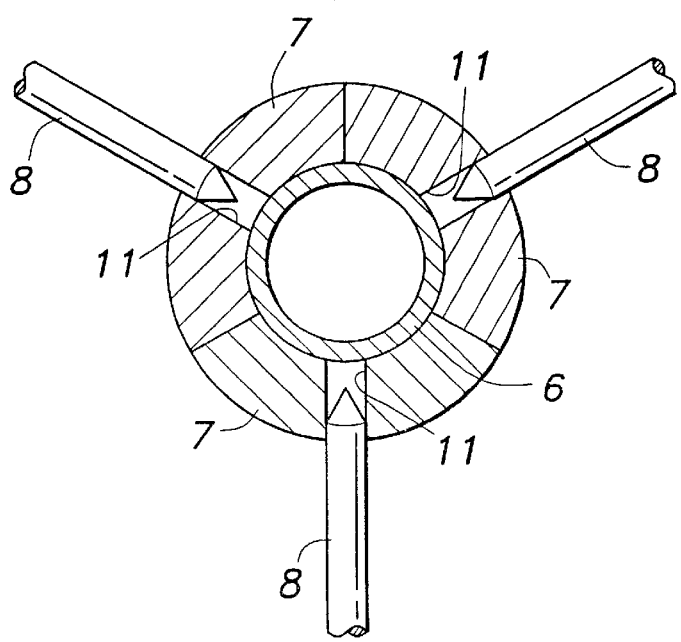

METHOD FOR PROCESSING AN INSERT PIPE FOR USE IN INJECTION MOLDING

CROSS REFERENCE TO RELATED APPLICATION

This application is a Divisional of application Ser. No. 09/529,944, filed Apr. 20, 2000 now U.S. Pat. No. 6,511,232.

TECHNICAL FIELD

The present invention relates to a metallic insert pipe which is designed to be placed inside a metallic die set as an insert member when producing an insert molded article by injection molding, a method for processing such an insert pipe, and a molded article having an insert pipe buried therein, and can be applied to various technical fields including those involving power transmission shaft members such as pipe shafts, lead screws and shafts integrally carrying cams and gears, and optical fiber connector ferrules.

BACKGROUND OF THE INVENTION

The inventor of this application previously proposed a lead screw, a pipe shaft and a method and metallic die set for molding such articles in Japanese patent publication (kokoku) No. 5-52765, as a power transmission shaft member having a metallic insert pipe buried therein as an insert member.

The power transmission shaft member such as a lead screw and a pipe shaft according to this proposal is produced in the following manner. A metallic pipe having a large number of through holes passed through the outer circumferential wall thereof is placed in a metallic die set adapted to the outer contour of the power transmission shaft member, and resin material is injected into the metallic pipe in the axial direction. The resin material initially fills the interior of the metallic pipe, and then flows to the exterior of the metallic pipe via the through holes. As a result, a power transmission shaft member having a prescribed outer contour is produced with the metallic pipe and the resin material molded into a single body.

The metallic pipe serving as the insert member is typically made of hard metallic material such as stainless steel, and is provided with a large number of holes passed through the outer circumferential wall thereof. When these holes are formed by a laser beam, the material surrounding the hole may be deformed by generation of strains and deposition of sputters, and such strains and sputters are required to be removed by grinding and other methods. The thinning and annealing of the material surrounding the hole which occur as a result of grinding and laser radiation, respectively, tend to make the material surrounding the hole brittle, and reduce the mechanical strength thereof.

When an insert molding is carried out by burying a metallic pipe in the molded article, sink marks tend to develop near the axial end portions inside the metallic pipe, and around the holes. In particular, when there is any deformation around the holes due to strains and sputter deposition, the mold quality of the insert molded article such as a lead screw which requires a high level of dimensional precision tends to be impaired. When the mechanical strength of the part surrounding the holes is reduced, the bonding between the metallic pipe and the resin material is impaired. Such a reduction in the bonding strength could lead to serious consequences in the case of molded articles such as optical fiber connector ferrules which require a high level of axial dimensional precision.

A conventional optical fiber connector ferrule typically consists of an inner portion including a large bore for receiving a sheathed core of an optical fiber cable, and a small bore for receiving an exposed (glass) core of the optical fiber cable, and an outer portion comprising a radially projecting flange portion, and is generally formed as a metal ferrule, as disclosed, for instance, as prior art in FIG. 8 of Japanese patent publication (kokoku) No. 5-36762, titled as "optical connector and method for producing an optical connector ferrule".

Such a ferrule requires a grinding finish to ensure the necessary level of positioning precision, and not suited for mass production with an added disadvantage of a high production cost. The above cited patent publication includes a proposal to provide a novel method for producing a ferrule which addresses such problems.

According to the proposed method for producing a ferrule, the metallic pipe is placed in the metallic die set, and a sheathed optical fiber core having a part of the sheath removed and thereby exposing part of the optical fiber core is received in the metallic pipe. Two ferrules are simultaneously molded, and then cut apart into two ferrules.

According to this production method, because a pair of ferrules are jointly molded, and are then cut into two parts, the coaxial precision of the ferrules can be improved, but a highly complex post-processing is required to achieve a favorable optical connecting surface. The post-processing includes the steps of cutting the jointly molded assembly at a part of the metallic pipe, and finishing the cut end surfaces of the metallic pipe and the core wire of the optical fiber cable.

BRIEF SUMMARY OF THE INVENTION

In view of such problems of the prior art, a primary object of the present invention is to provide an insert pipe for injection molding which can be more integrally bonded to the resin material than has hitherto been possible.

A second object of the present invention is to provide an insert pipe for injection molding which has a number of through holes passed through the outer circumferential wall thereof and is from the problems which would be produced if the through holes are formed by a laser beam.

A third object of the present invention is to provide an insert pipe for injection molding which can prevent sink marks from being developed in the outer surface of the molded article.

A fourth object of the present invention is to provide a method which can fabricate such an insert pipe both economically and easily.

A fifth object of the present invention is to provide a molded article having a pipe insert molded therein which may consist of a power transmission shaft member such as a pipe shaft, a lead screw and a shaft rod integrally carrying a cam or gear, and an optical fiber ferrule.

According to the present invention, such objects can be accomplished by providing an insert pipe for injection molding, wherein: a plurality of through holes are passed through an outer circumferential wall of a metallic pipe, and each of said through holes comprises an opening, and at least one raised piece formed by bending, typically inwardly, a wall part of said metallic pipe adjacent to said opening.

According to the insert pipe of the present invention, the raised piece raised from the edge of the opening reinforces the edge of the opening, and prevents the deformation of the metallic pipe when subjected to stress either during the process of injection molding or during use. When the insert pipe is buried in the molded article, the raised piece is also effective as an engagement member for increasing the bonding force between the insert pipe and the resin material and preventing the development of sink marks resulting from the volumetric shrinking of the resin material. Typically, said opening is polygonal in shape, and said raised piece is raised from each side of said polygonal opening. For application of the present invention to a molded article, the through holes are typically arranged along both circumferential and axial directions in said metallic pipe. In case of a lead screw, the through holes are typically arranged in a spiral pattern so as to correspond the threaded section of the molded article.

When a molded article is produced by using such an insert pipe, the molded article additionally includes an inner molded portion molded inside said insert pipe; and an outer molded portion molded outside said insert pipe and connected to said inner molded portion via said openings. Thus, the insert pipe is firmly embedded in the molded article because the inner molded portion and the outer molded portion are integrally connected with each other via the through holes, and the overall mechanical strength can be increased. In particular, the raised piece contributes to the increase in the bonding force between the molded part and the insert pipe as well as increasing the mechanical strength of the insert pipe itself. Also, the enhanced bonding force contributes to the prevention of sink marks which typically arise from the volumetric shrinking of the resin material. By virtue of such properties, the molded article of the present invention is particularly advantageous for use as a power transmission shaft, a lead screw, and an optical fiber ferrule.

The present invention additionally provides a method for processing an insert pipe for injection molding, comprising the steps of: placing a metallic pipe in a shape retaining support assembly in an open state, said assembly comprising a plurality of shape retaining support members each having an arcuate shape retaining surface so as to jointly define a cavity for closely surrounding an outer profile of said metallic pipe; moving said shape retaining support members so as to closely surround said metallic pipe with said shape retaining surfaces of said shape retaining support members; and passing piercing punches through holes defined in said shape retaining support assembly so as to form through holes in said metallic pipe in a prescribed pattern, said piercing punches being adapted in such a manner that each of said holes comprises an opening, and at least one raised piece formed by bending a wall part of said metallic pipe adjacent to said opening. To form such a raised piece in a simple and reliable manner, each of the piercing punches may be provided with a pyramidal point. The pyramidal point may have any desired number of sides depending on the number of raised pieces that are desired to be formed on each through hole. Even a conical point may used. In this case, the raised piece may have the shape of an irregular burr or the shape of a crown.

Thus, by using a corresponding number of piercing punches, a large number of through holes can be formed simultaneously without causing any localized stress or deformation to the insert pipe while ensuring a high level of dimensional precision because the shape retaining support assembly prevents the insert pipe from deformation and can keep the cross section of the pipe member in true circle. By placing the piercing punches in an appropriate pattern, it is possible to form through holes arranged in a spiral pattern or in any desired pattern. Also, the apparatus for implementing this method can be constructed at a relatively low cost, and is suitable for mass producing such insert pipes.

Because the part surrounding each communication hole is not strained or deformed by the deposition of sputters, as opposed to the forming of such holes with a laser beam, grinding and other post-processing is not required. Also, the part surrounding each communication hole is not made brittle due to grinding or annealing resulting from radiation of a laser beam, and the mechanical strength of the insert pipe is therefore ensured.

In particular, when the present invention is applied to an insert pipe molded article which has a distinctive feature on the exterior thereof such as a lead screw or other power transmission shaft member, it is effective in ensuring lead coaxial precision of the outer contour thereof. When it is applied to an insert pipe molded article which has a distinctive feature in the interior thereof such as an optical connector ferrule, it is effective in ensuring the coaxial precision of the inner contour thereof. In this manner, the present invention can be effectively applied to a wide range of insert pipe molded articles.

BRIEF DESCRIPTION OF THE DRAWINGS

Now the present invention is described in the following with reference to the appended drawings, in which:

FIG. 2 is a diagrammatic view of the first stage of the method for manufacturing the insertion pipe according to the present invention;

FIG. 3 is a diagrammatic view of the second stage of the method for manufacturing the insertion pipe according to the present invention

DETAILED DESCRIPTION OF THE PREFERRED EMBODIMENTS

Figure 1:
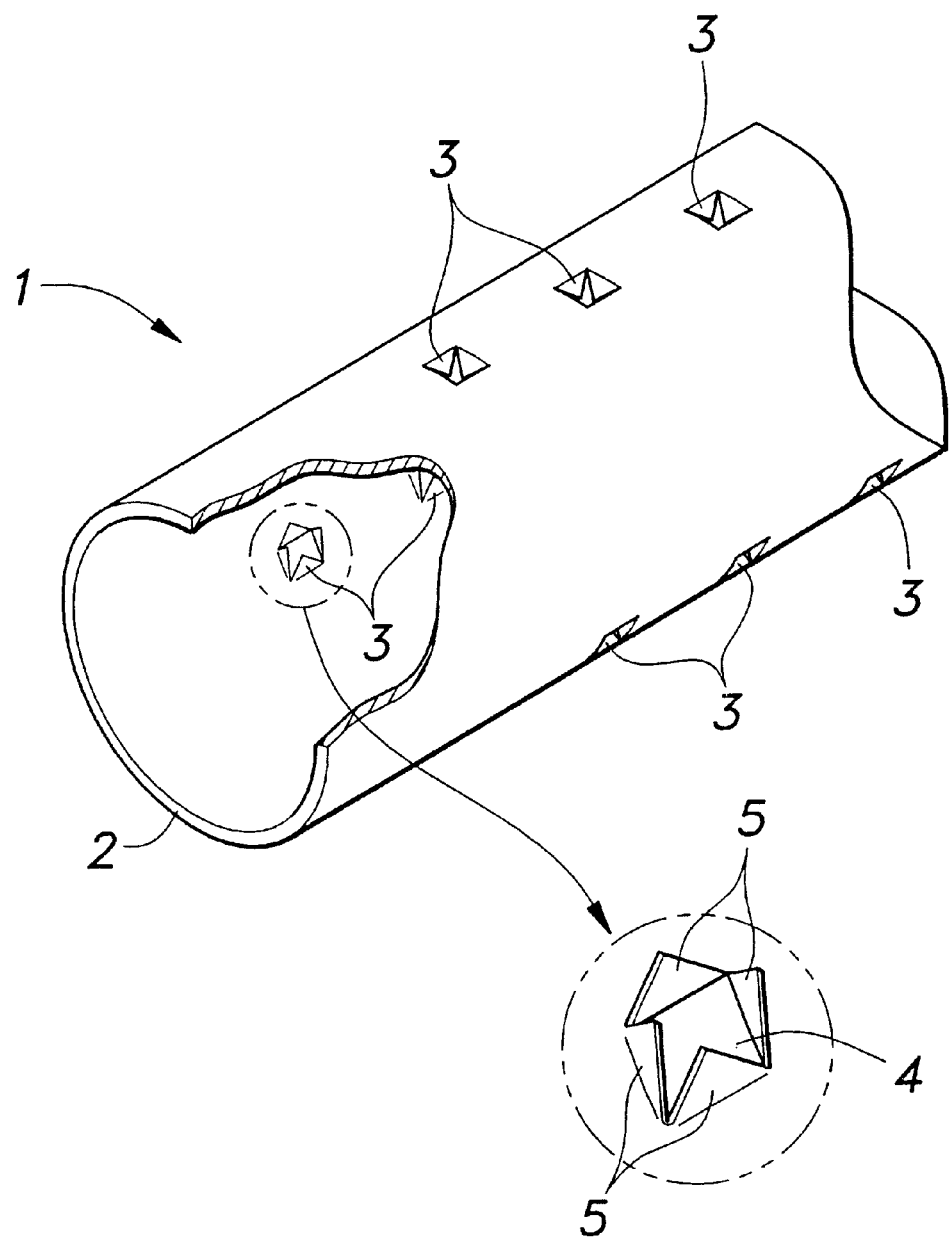
FIG. 1 is an enlarged perspective view of an essential part of the metallic pipe 1 serving as an insert pipe embodying the present invention.
Figure 4:
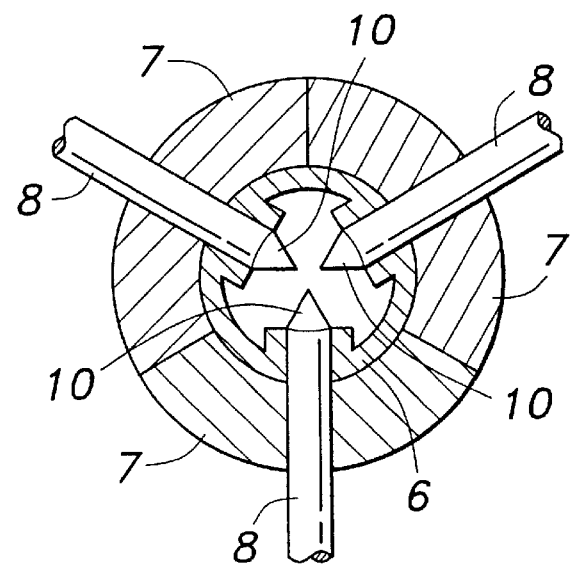
FIG. 4 is a diagrammatic view of the third stage of the method for manufacturing the insertion pipe according to the present invention.

Referring to FIG. 1, a metallic pipe 1 serving as an insert pipe for injection molding is formed as a hollow cylindrical member for instance made of stainless steel, and a number of communication holes 3 are passed through the outer circumferential wall 2 at regular intervals both in circumferential and axial directions to communicate the interior and the exterior with each other. Each of the communication holes 3 consists of a polygonal opening 4 and raised pieces 5 which are raised from the edge of the opening 4 in the outer circumferential wall toward the interior of the metallic pipe 1 like flower petals.

In the illustrated embodiment, the communication holes 3 are formed at three locations along the circumferential direction of the outer circumferential wall 2 at the interval of 120 degrees, and each of the polygonal communication holes 3 is square in shape, and is surrounded by four triangular raised pieces 5 raised inward from the edge of the opening 4 like flower petals. The communication holes 3 may be given with different shapes as desired depending on each particular application.

For instance, the communication holes 3 may be arranged at two locations in the outer circumferential wall 2 at the interval of 180 degrees in the circumferential direction so as to oppose each other, at four locations at the interval of 90 degrees, or more densely. When the insert pipe is to be used for the insert member of a lead screw, these communications holes are preferably arranged in the outer circumferential wall 2 along a spiral path. The openings 4 may be given with other polygonal shapes such as triangle, pentagon, or those having a larger number of sides. The number of the raised pieces 5 would be three in the case of a triangular opening 4, and five in the case of a pentagonal opening 4. The opening may also be circular in shape. In this case, the raised piece would be shaped like a crown or may be irregularly shaped like burr.

The raised pieces 5 raised from the edge of each opening 4 prevent the deformation of the metallic pipe 1 during the injection molding process by reinforcing the edge of the opening, and when an article is molded with the metallic pipe 1 buried therein as an insert pipe, serves as engagement means which enhances the bonding between the molded resin portion and the insert pipe and prevents the development of sink marks due to the shrinking of the molded resin portion.

The method for processing the metallic pipe 1 is described in the following with reference to FIGS. 2 to 6. A tubular pipe member 6 cut into a prescribed length is placed at the axial center C of a press device with the axial ends of the pipe member 6 engaged by suitable support members (not shown in the drawings). Around this pipe member 6 are arranged a shape retaining support assembly 7 (7A, 7B and 7C) consisting of a plurality of parts and designed to support the outer circumferential surface of the pipe member 6 so as to maintain the shape thereof, and piercing punches 8 (8A, 8B and 8C) passed through the shape retaining support assembly 7 and designed to form holes in the pipe member 6, all in radially moveable manner.

The shape retaining support assembly 7 includes a plurality (three, in the illustrated embodiment) of equally circumferentially divided parts each defining an arcuate shape retaining surface 9 (9A, 9B and 9C) at a forward end thereof. The rear end of each arcuate shape retaining assembly part is fitted with a linear reciprocating actuator (not shown in the drawings) consisting of, for instance, an hydraulic cylinder. Thus, once the shape retaining assembly parts have fully advanced, the arcuate shape retaining surfaces 9A, 9B and 9C jointly closely surround the outer circumferential surface of the pipe member 6 so as to prevent the pipe member 6 from deforming as the through holes are being formed in the pipe member 6.

Each piercing punch 8 (8A, 8B and 8C) consists of a rod or pipe having a circular or polygonal cross section having a pyramidal cutting point 10. Each piercing punch 8 is passed through a through hole 11 formed in the corresponding shape retaining support assembly part 7A, 7B and 7C so as to be advanced and withdrawn in the radial direction in synchronism with a known linear reciprocating actuator which may consist of an hydraulic cylinder.

The method for processing the metallic pipe 1 is described in the following in a time sequence. The shape retaining support assembly 7 (7A, 7B and 7C) is moved from the first stage illustrated in FIG. 2 toward the axial center C with the pipe member 6 placed at the axial center C and supported at the upper and lower ends thereof. The arcuate shape retaining surfaces 9A, 9B and 9C are made to fully surround the outer circumferential surface of the pipe member 6 in the second stage illustrated in FIG. 3, and the piercing punches 8 (8A, 8B and 8C) are advanced toward the axial center C. As a result, the pyramidal cutting points 10 pierce through the outer circumferential wall of the pipe member 6 in the third stage illustrated in FIG. 4.

Figure 5:
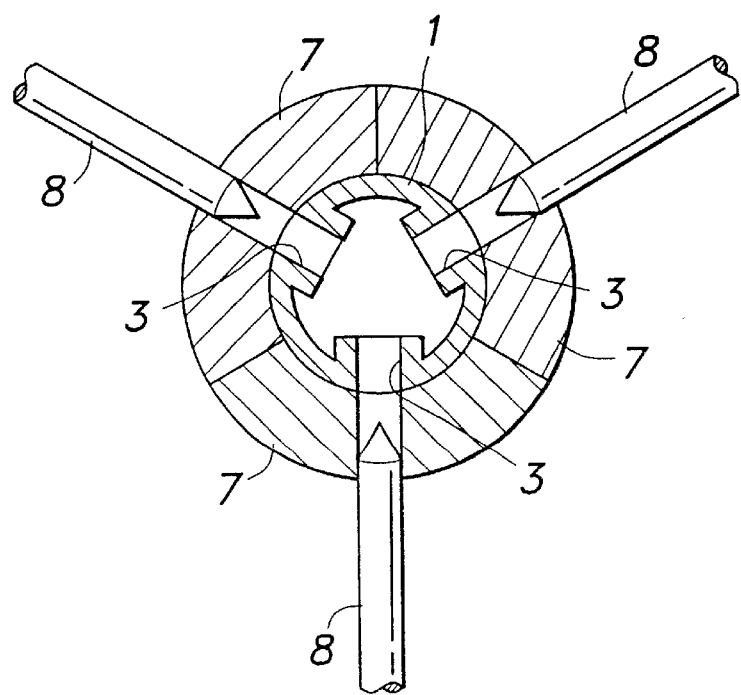
FIG. 5 is a diagrammatic view of the fourth stage of the method for manufacturing the insertion pipe according to the present invention.
Figure 6:
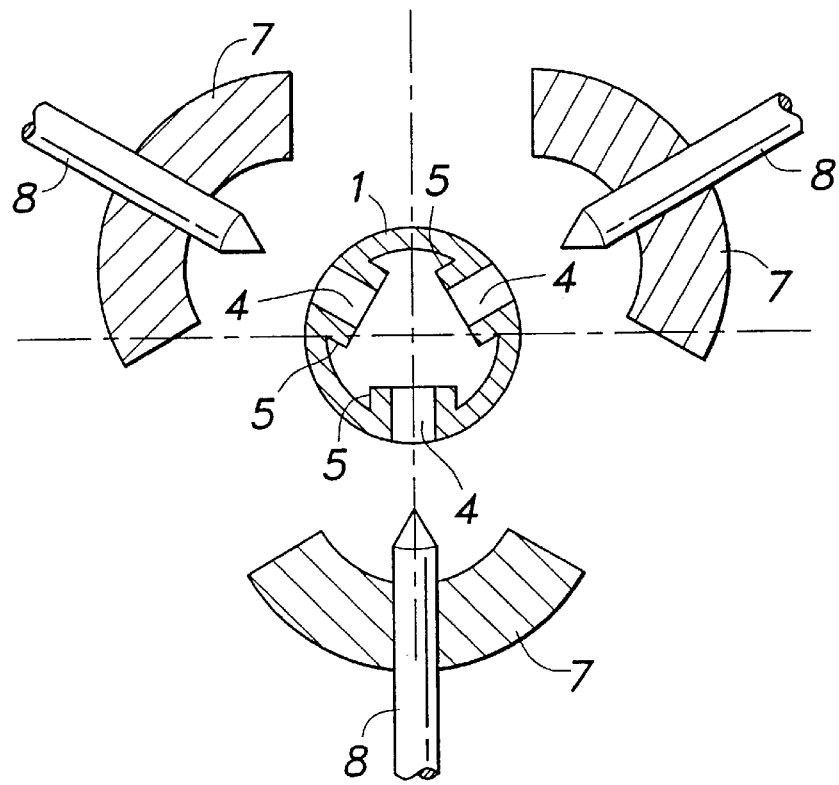
FIG. 6 is a diagrammatic view of the fifth stage of the method for manufacturing the insertion pipe according to the present invention.

The piercing punches 8 (8A, 8B and 8C) are then withdrawn away from the axial center C in the fourth stage illustrated in FIG. 5, and the shape retaining support assembly 7 (7A, 7B and 7C) is moved away from the axial center C in the fifth stage illustrated in FIG. 6 so that the metallic pipe 1 is completed with the communication holes 3 passed through the outer circumferential wall thereof. As each communication hole 3 is pierced in the metallic pipe 1 and enlarged by the corresponding pyramidal cutting point 10, the material of the metallic pipe 10 is raised from the peripheral edge of the opening just like flower petals, and the communication hole 3 is ultimately formed with a polygonal opening 4 and raised pieces 5 raised inwardly from the peripheral part of the outer circumferential wall surrounding the opening 4 as shown in FIG. 1.

Because a large number of communication holes 3 can formed simultaneously in an economical way by arranging the piercing punches 8 along the length of the shape retaining support assembly 7, the metallic pipe 1 serving as an insert pipe can be made both easily and economically. In particular, when the piercing punches 8 are arranged along a spiral path, an insert pipe for a lead screw which is described hereinafter can be manufactured both easily and economically.

When the outer circumferential wall of the pipe member 6 is subjected to the pressure from the piercing punches 10, the material of the pipe member 6 is prevented from flowing in any direction because the pipe member 6 is closely surrounded by the arcuate shape retaining surfaces 9 (9A, 9B and 9C) so that the communication holes 3 can be formed in an accurate manner with the cross section of the pipe member kept in true circle without causing any deformation to the pipe member. The completed metallic pipe 1 is therefore highly accurate in shape.

The metallic pipe 1 which is formed with holes by punching, as opposed to forming holes by laser, is free from any distortions or sputter deposition around each hole, and is therefore not required to be ground or otherwise post-processed. Also, the possibility of making the part surrounding each hole brittle from grinding and annealing due to laser radiation can be avoided, and the necessary mechanical strength is ensured.

Figure 7:
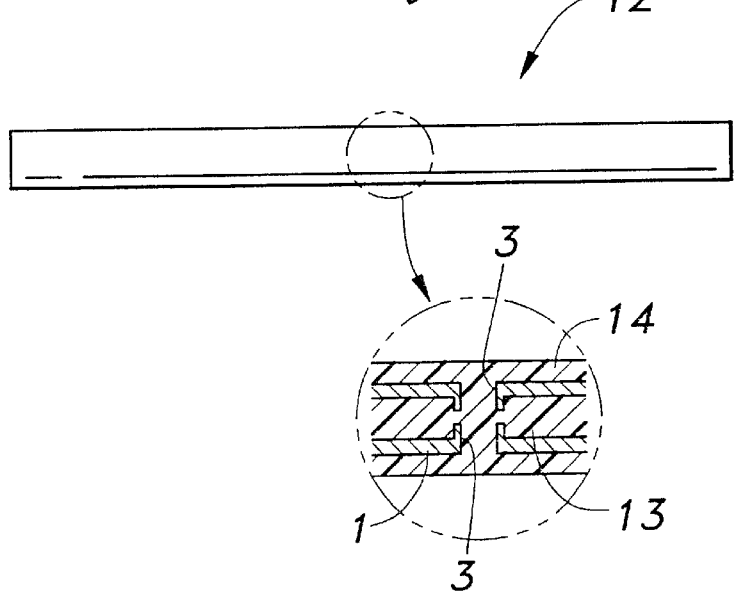
FIG. 7 is a plan view and an enlarged fragmentary sectional view of an essential part of the pipe shaft given as an embodiment of the molded article having an insert pipe molded therein according to the present invention.

Now is described a molded article having the metallic pipe 1 insert molded therein as an insert pipe. In the case of the pipe shaft 12 illustrated in FIG. 7, for instance, the metallic pipe 1 having communication holes 3 each consisting of an opening 4 and raised pieces 5 is placed in a metallic die set defining a cylindrical cavity having a larger inner diameter than the outer diameter of the metallic pipe 1 therein. Resin material is then injected axially into the interior of the metallic pipe 1. The resin material initially fills the interior of the metallic pipe 1, and after flowing through the communication holes 3, reaches the exterior of the metallic pipe 1 with the result that a pipe shaft 12 having a core portion 13 and a sheath portion 14 both consisting of integrally cured resin material inside and outside the metallic pipe 1, respectively, is obtained.

In the case of the lead screw the metallic pipe 1 having communication holes 3 along a spiral path each consisting of an opening 4 and raised pieces is placed in a metallic die set defining a spirally contoured cavity having a larger inner diameter than the outer diameter of the metallic pipe 1 therein. Resin material is then injected axially into the interior of the metallic pipe 1. The resin material initially fills the interior of the metallic pipe 1, and after flowing through the communication holes 3, reaches the exterior of the metallic pipe 1 with the result that a lead screw having a core portion and a lead thread portion both consisting of integrally cured resin material inside and outside the metallic pipe 1, respectively, is obtained.

In these embodiments, molten resin was introduced axially into the insert pipe, and was allowed to flow out of the communication holes to form the outer part of the molded article. However, if desired, it is also possible to introduce molten resin into both the interior and exterior of the insert pipe at the same time, and allow the two flows of the molten resin to meet in suitable part of the die cavity either inside or outside the insert pipe.

In the case of a power transmitting shaft member such as the pipe shaft 12 and the lead screw 15 mentioned above, the raised pieces 5 shaped like flower petals are formed around each of the communication holes 3 of the metallic pipe 1 which join the inner part of the resin material such as the core portions 13 and 16 with the outer part of the resin material such as the sheath portion 14 and the lead thread portion 17, with the metallic pipe 1 buried in the resin material as an insert pipe, and the raised pieces 5 prevent the deformation of the metallic pipe 1 by reinforcing the peripheral edges of the openings 4 and improve the dimensional precision of the outer portion such as the sheath portion 14 and the lead thread portion 16. In particular, the raised pieces 5 perform the function of engaging the inner portion such as the core portions 13 and 16, and enhances the bonding between the metallic pipe 1 and the resin material and eliminate any sink marks that may arise from the volumetric contraction of the resin member.

Now is described a ferrule for an optical fiber connector having the metallic pipe 1 insert molded therein as an insert pipe with reference to FIGS. 9 to 11. This ferrule 18 comprises an inner portion disposed inside the metallic pipe 1, and an outer portion. The inner portion consists of a core member 22 including a large bore 19 for receiving a sheathed optical fiber, a small bore 20 for receiving an exposed fiber core, and a tapered hole 21 for communicating the large bore 19 and the small bore 20 with each other. These bores 19 and 20 and the tapered hole 21 are disposed all in a coaxial relationship. The outer portion consists of a flange portion 23 projecting from the metallic pipe 1.

Communication holes 3 each having an opening 4 and raised pieces 5 similarly to the insert pipe used in the shaft member for power transmission are formed in the metallic pipe 1 at regular intervals in both circumferential and axial directions so as to communicate the interior and exterior of the outer circumferential wall with each other. The internal core portion 22 and the external flange portion 23 are connected with each other via the communication holes 3. If desired, the communication holes 3 may be formed only in the part of the insert pipe around which the external flange portion 23 is formed, instead of forming them substantially over the entire length of the insert pipe.

This ferrule 18 is manufactured as described in the following. The metallic pipe 1 is placed in a metallic die set defining a cavity conforming to the outer portion of the ferrule, and a molding core block adapted to the large bore 19, the small bore 20 and the tapered bore 21 is placed at the axial center of the metallic pipe. Resin material is then injected axially into the metallic pipe 1. The resin material initially fills the interior of the metallic pipe 1, and then flows to the exterior of the metallic pipe 1 via the communication holes 3 with the result that the core portion 22 and the flange portion 23 both consisting of cured resin material are integrally formed on the interior and exterior of the metallic pipe 1, respectively. The resin material which has flowed into the communication holes 3 of the remaining part of the insert pipe 1 improves the bonding force between the core portion 22 and the insert pipe 1.

In this ferrule 18 described above, the raised pieces 5 shaped like flower petals are formed around each of the communication holes 3 of the metallic pipe 1 so that the metallic pipe 1 is prevented from deformation by reinforcing the peripheral edges of the openings 4 and the bonding between the metallic pipe 1 and the core portion 22 is enhanced thereby eliminating the generation of sink marks that may arise due to volumetric contraction of the resin material. Also, the coaxial precision of the optical fiber that is passed through the bores 19, 20 and 21 can be improved.

The ferrule 19 described above is suited for mass production and can be produced at low cost as compared to the conventional metallic ferrule manufactured by machining. Also, as compared to the conventional resin molded ferrule mentioned above, the production cost is lower because of the absence of the need to divide the molded piece into two parts and to finish the end surfaces.

Although the present invention has been described in terms of preferred embodiments thereof, it is obvious to a person skilled in the art that various alterations and modifications are possible without departing from the scope of the present invention which is set forth in the appended claims.

What is claimed is:

1. A method for processing an insert pipe for injection molding, comprising the steps of:

placing a metallic pipe in a shape retaining support assembly in an open state, said assembly comprising a plurality of shape retaining support members each having an arcuate shape retaining surface so as to jointly define a cavity for closely surrounding an outer profile of said metallic pipe;

moving said shape retaining support members so as to closely surround said metallic pipe with said shape retaining surfaces of said shape retaining support members; and passing piercing punches through holes defined in said shape retaining support assembly so as to form through holes in said metallic pipe in a prescribed pattern, said piercing punches being adapted in such a manner that each of said holes comprises an opening, and at least one raised piece formed by inwardly bending a wall part of said metallic pipe adjacent to said opening.

2. A method for processing an insert pipe for injection molding, comprising the steps of:

placing a metallic pipe in a shape retaining support assembly in an open state, said assembly comprising a plurality retaining support members having an arcuate shape retaining surface so as to jointly define a cavity for closely surrounding an outer profile of said metallic pipe;

moving said shape retaining support members so as to closely surround said metallic pipe with said shape retaining surfaces of said shape retaining support members; and passing piercing punches, each of which has a pointed end, through holes defined in said shape retaining support assembly so as to form through holes in said metallic pipe in a prescribed pattern, said piercing punches being adapted in such a manner that each of said through holes formed in said metallic pipe comprises an opening, and at least one raised piece formed by inwardly bending a wall part of said metallic pipe adjacent to said opening.

3. A method for processing an insert pipe for injection molding according to claim 2, wherein said opening is polygonal in shape, and said raised piece is raised from each side of said polygonal opening.

4. A method for processing an insert pipe for injection molding according to claim 2, wherein said piercing punches are each provided with a pyramid point.

5. A method for processing an insert pipe for injection according to claim 2, wherein said through holes of said metallic pipe are arranged along both circumferential and axial directions of said metallic pipe.

6. A method for processing an insert pipe for injection molding according to claim 2, wherein the step of passing piercing punches comprises a step of passing piercing punches from at least two different radial toward an axial center of said metallic pipe.

7. A method for processing an insert pipe for injection molding according to claim 2, wherein said insert pipe is used in forming an optical fiber ferrule by insert molding.

8. A method for processing an insert pipe for injection molding according to claim 2, wherein each of said shape retaining support members is provided with a corresponding one of said piercing punches.

* * * * *